United States Patent [19]

Ohsaka et al.

[11] Patent Number: 4,904,417
[45] Date of Patent: Feb. 27, 1990

[54] FLUORINE-CONTAINING POLYETHER AND PROCESS FOR PREPARING THE SAME

[75] Inventors: Yohnosuke Ohsaka; Takashi Tohzuka; Yoshitaka Honda; Norio Yanagisawa, all of Osaka, Japan

[73] Assignee: Daikin Industries Ltd., Osaka, Japan

[21] Appl. No.: 201,032

[22] Filed: Jun. 1, 1988

[30] Foreign Application Priority Data

Jun. 2, 1987 [JP] Japan .................. 62-139518

[51] Int. Cl.$^4$ .............. C07C 55/40; C07C 59/00; C07C 59/135
[52] U.S. Cl. .................. 562/849; 562/579; 562/583; 562/850; 562/853; 204/157.88
[58] Field of Search .............. 568/615; 562/579, 583; 210/544 F, 544 Y

[56] References Cited

U.S. PATENT DOCUMENTS

| | | | |
|---|---|---|---|
| 3,505,411 | 4/1970 | Rice | 568/615 |
| 3,637,842 | 1/1972 | Stump et al. | 260/544 F |
| 3,849,504 | 11/1974 | Mitsch | 568/615 |

FOREIGN PATENT DOCUMENTS

| | | |
|---|---|---|
| 721328 | 11/1965 | Canada . |
| 729697 | 3/1966 | Canada . |
| 750427 | 1/1967 | Canada . |
| 1366119 | 5/1963 | France . |
| 1038365 | 8/1966 | United Kingdom . |
| 1000802 | 8/1968 | United Kingdom . |

Primary Examiner—Paul J. Killos
Attorney, Agent, or Firm—Birch, Stewart, Kolasch & Birch

[57] ABSTRACT

A fluorine-containing polyether of the formula:

$$A-X-A'$$

wherein A and A' are the same or different and are each —COF, —COCl or —COOH, and X is —CF$_2$CF$_2$—R$_f$—O—C$_m$F$_{2m}$—O—R$_f'$CF$_2$CF$_2$— in which R$_f$ and R$_f'$ are the same or different and are each a group containing a perfluoroalkylpolyether group, and m is a number of from 1 to 6, and a fluorine-containing polyether of the formula:

$$Z-X_n-Z'$$

wherein X is the same as defined above, Z and Z' are the same or different and are each —COF, —COCl, —COOH or —CF$_2$CF$_2$—R$_f$—B in which R$_f$ is the same as defined above and B is a fluorine atom or a C$_1$–C$_5$ perfluoroalkyl group, and n is a number of from 0 to 100 provided that when n is 1, Z and Z' are each —CF$_2$CF$_2$R$_f$B, provided that when n is 0, both Z and Z' are each —CF$_2$CF$_2$R$_f$B or when n is 1, at least one of Z and Z' is —CF$_2$CF$_2$R$_f$B.

5 Claims, 1 Drawing Sheet

FLUORINE-CONTAINING POLYETHER AND PROCESS FOR PREPARING THE SAME

BACKGROUND OF THE INVENTION

1. Field of the Invention

The present invention relates to a fluorine-containing polyether and a method for preparing the same. More particularly, the present invention relates to a fluorine-containing polyether which can have a higher molecular weight than conventional fluorine-containing polyethers and a method for preparing the same.

2. Description of the Related Art

Fluorine-containing polyethers, particularly perfluoropolyethers are high performance, non-flammable oils, and having resistance to heat and have chemicals and good lubricating properties. As a result, fluorine-containing polyethers are widely used in various fields including the aerospace industry and the semiconductor industry. However, by conventional preparation processes, it is hardly possible to prepare a fluorine-containing polyether having a high molecular weight.

A fluorine-containing polyether having a terminal acyl fluoride group is unstable. To stabilize such a terminal group, there have been proposed various measures such as a reaction of a corresponding polyfluoropolyether with fluorine ($F_2$) at a high temperature of hydrolysis of the acyl fluoride group with water followed by a reaction with fluorine. However, it is well known that the reaction with fluorine is dangerous.

SUMMARY OF THE INVENTION

One object of the present invention is to provide a novel fluorine-containing polyether which can have a higher molecular weight than the conventional fluorine-containing polyethers.

Another object of the present invention is to provide a process for preparing such a novel fluorine-containing polyether.

BRIEF DESCRIPTION OF THE DRAWING

FIGURE is an IR chart of the compound produced according to Example 4.

DETAILED DESCRIPTION OF THE INVENTION

Figure 1:
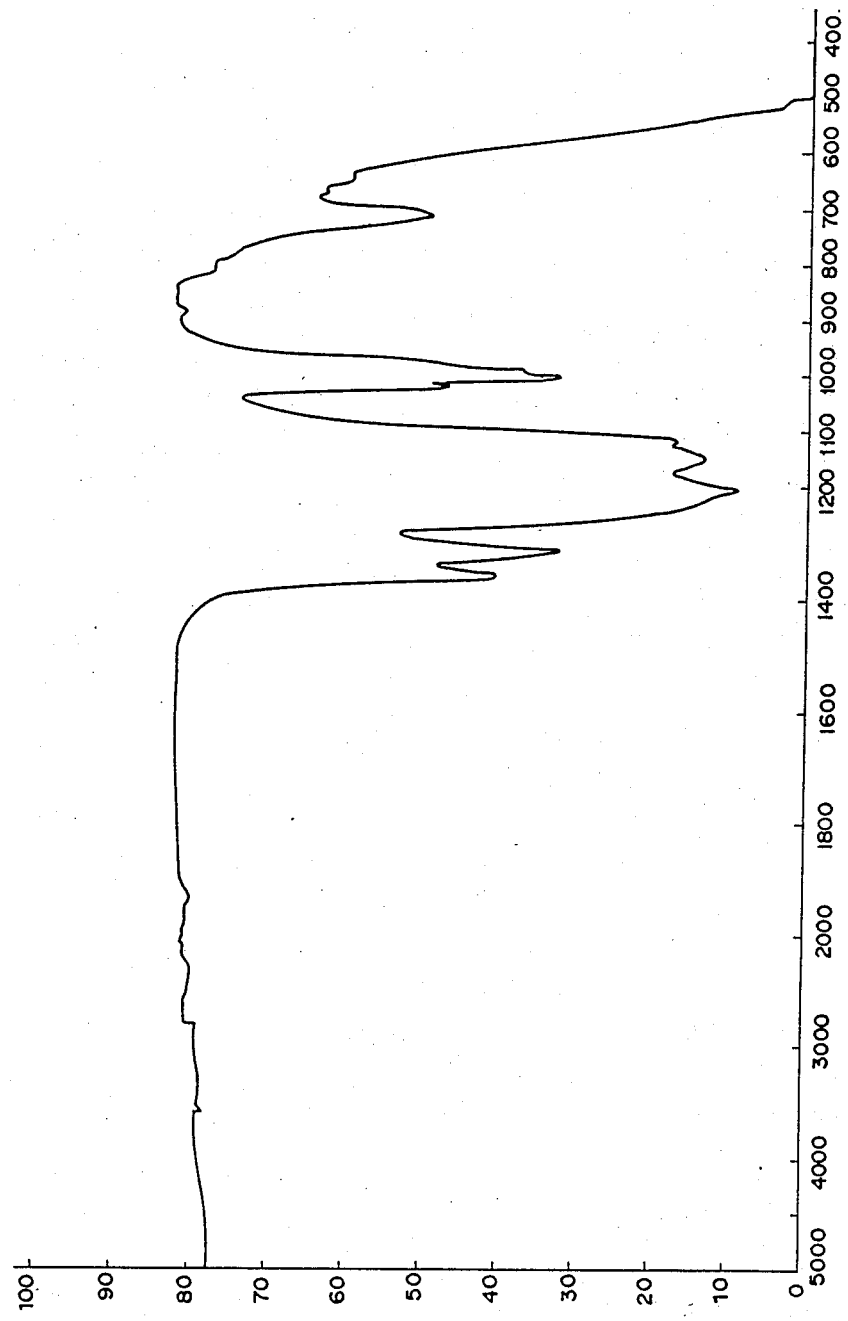

According to the first aspect of the present invention, there is provided a fluorine-containing polyether of the formula:

$$A-X-A' \quad (I)$$

wherein A and are each A' are the same or different and —COF, —COCl or —COOH, and X is —$CF_2CF_2$—$R_f$—O—$C_mF_{2m}$—O—$R_f'CF_2CF_2$— in which $R_f$ and $R_f'$ are the same or different and are each a group containing a perfluoroalkylpolyether group, and m is a number of from 1 to 6.

Generally, the fluorine-containing polyether (I) has a molecular weight of from 1,000 to 20,000.

The fluorine-containing polyether (I) may be prepared by reacting a difunctional compound of the formula:

$$A-(CF_2CF_2)_m-A' \quad (II)$$

wherein A, A' and m are the same as defined above with 2,2,3,3-tetrafluorooxetane (hereinafter referred to as "tetrafluorooxetane") and/or hexafluoropropyleneoxide.

As a polymerization initiator, cesium fluoride and the like can be used. To a mixture of the difunctional compound (II) and the polymerization initiator, tetrafluorooxetane is added at a temperature of −30° C. to +20° C. The polymerization reaction can be carried out in a solvent such as monoglyme, tetraglyme, polyglyme, trichlorotrifluoroethane, tetrahydrofuran and the like. A polymerization degree can be controlled by varying the molar ratio of the difunctional compound (II) and tetrafluorooxetane. After polymerization, the solvent is removed. By fluorination with fluorine gas, a perfluorocompound can be prepared. Polymerization of hexafluoropropylene oxide can be carried out in substantially the same manner as above.

According to the second aspect of the present invention, there is provided a fluorine-containing polyether of the formula:

$$Z-X_n-Z' \quad (III)$$

wherein X is the same as defined above, Z and Z' are the same or different and are each —COF, —COCl, —COOH or —$CF_2CF_2$—$R_f$—B in which $R_f$ is the same as defined above and B is a fluorine atom or a $C_1$-$C_5$ perfluoroalkyl group, and n is a number of from 0 to 100, provided that when n is 0, both Z and Z' are each —$CF_2CF_2R_fB$ or when n is 1, at least one of Z and Z' is —$CF_2CF_2R_fB$.

Generally, the fluorine-containing polyether has a molecular weight of from 2,000 to 200,000.

The fluorine-containing polyether (III) may be prepared by polycondensating a fluorine-containing polyether having a functional group at least at one molecular end of the formula:

$$A-X-A' \quad (IV)$$

or $$A-CF_2CF_2-R_f-B \quad (V)$$

wherein A, A', B, $R_f$ and X are the same as defined above by irradiation with ultraviolet light.

In this process, the terminal group is preferably a acyl fluoride group, although it may be a carboxylic acid group or an acid chloride group.

The ultraviolet light to be used for irradiation has a wavelength of not greater than 350 nm, preferably not greater than 250 nm and more preferably from 180 to 210 nm. The irradiation time depends on the wavelength of ultraviolet light and/or the type of fluorine-containing polyether (IV) or (V). A reaction rate is proportional to the irradiated energy and of apparently zero order against a concentration of the —COF groups.

As the molecular weight increases, the viscosity of the reaction system rapidly increases which causes the stirring of the system to become difficult. Therefore, the reaction is preferably carried out in the presence of a solvent. The starting material may be subjected to the reaction without being diluted with a solvent.

When the starting material as such is subjected to the reaction, the reaction temperature is from room temperature to 350° C., preferably from 100° to 200° C.

When a solvent is used, the ones which do not or hardly absorb ultraviolet light are preferable. In addition, the solvent is preferably removed by distillation under reduced pressure after the reaction. Examples of the solvents are a low molecular weight material of the starting polyether, perfluoroalkane (e.g. perfluorooctane, etc.), perfluorobenzene, perfluoroamine and the like.

As a light source for the ultraviolet light, an immersion type light source is advantageous in view of its irradiation efficiency, although an outside light source may be used. When the outside light source is used, a reactor has a window through which the ultraviolet light irradiates the reaction system.

During the irradiation by ultraviolet light, an inert gas such as nitrogen and helium may be flowed into the reaction atmosphere.

The ether repeating unit which constitutes the fluorine-containing polyether chain of the present invention is represented by the formula:

$$-(C_3F_6O)_p-$$

wherein p is a number of from 1 to 200.

The repeating units $-(C_3F_6)-$ may be a straight or branched chain group and is preferably a straight chain group.

One of other suitable fluorine-containing polyether chain comprises a repeating unit structure of the formula:

$$-(CH_2CF_2CF_2O)_a-\\-(CHClCF_2CF_2O)_b-(CCl_2CF_2CF_2O)_c-(CHFCF_2CF_2O)_d-(CFClCF_2F_2O)_e-(CF_2CF_2CF_2O)_f-$$

wherein a, b, c, d, e and f are each 0 or a positive integer and satisfy the following equations:

$$2\leq a+b+c+d+e+f\leq 200 \text{ and } 1\leq a+c+d+f.$$

PREFERRED EMBODIMENTS OF THE INVENTION

The present invention will be illustrated by following Examples.

Example 1

An acyl fluoride (500 g) of the formula:

$$F-(CF_2CF_2CF_2O)_n-CF_2CF_2COF$$

wherein n is 25 on the average was charged in a stainless steel made 500 ml reactor having a window of 100 mm in diameter made of a film of a fluororesin (Neoflon PFA, a trade mark of Daikin Industries Ltd.).

While flowing nitrogen gas at a flow rate of 50 ml/min. in the reactor, the reaction liquid was irradiated from the outside by a 450 W high pressure mercury lamp (manufactured by Toshiba) for 30 hours. Thereafter, by infrared spectroscopic analysis, disappearance of a peak around 1,890 cm$^{-1}$ which corresponds to a specific absorption by the —COF group was confirmed.

The increase of viscosity and NMR spectrum confirmed quantitative formation of a compound of the formula:

$$[F-(CF_2CF_2CF_2O)_n-CF_2CF_2-]_2.$$

Yield, 490 g.

Example 2

In the same manner as in Example 1 but using, as an acyl fluoride, a compound of the formula:

$$F-(CHFCF_2CF_2O)_l-(CF_2CF_2CF_2O)_m-CF_2CF_2COF$$

wherein l:m is 3:7 and l+m is 20, the ultraviolet light was irradiated for 30 hours to quantitatively obtain a compound of the formula:

$$[F-(CHFCF_2CF_2O)_l-(CF_2CF_2CF_2O)_m-CF_2CF_2-]_2.$$

Yield, 485 g.

Example 3

An organic acid (88 g) of the formula:

$$F-(CF_2CF_2CF_2O)_n-CF_2CF_2COOH$$

wherein n is 25 on the average was charged in a stainless steel made 800 ml reactor having a window of 100 mm in diameter made of a film of a fluororesin (Neoflon FEP, a trade mark of Daikin Industries Ltd.).

While flowing nitrogen gas at a flow rate of 50 ml/min. in the reactor, the reaction liquid was irradiated from outside by a 450 W high pressure mercury lamp (manufactured by Toshiba) for 16 hours. Thereafter, by infrared spectroscopic analysis, disappearance of peaks which correspond to specific absorptions by the —COOH group and —COF group was confirmed.

The increase of viscosity and NMR spectrum confirmed formation of a compound of the formula:

$$[F-(CF_2CF_2CF_2O)_n-CF_2CF_2-]_2.$$

Yield, 83 g.

Example 4

In a stainless steel made 100 ml reactor which was equipped with a stirred and an upper opening of which was covered by a film of a fluororesin (Neoflon FEP), a perfluoropolyether (35 g) of the formula:

$$FCOCF_2CF_2-(OCF_2CF_2CF_2)_n-(OC_6F_{12}O)-(CF_2CF_2CF_2O)_n-CF_2CF_2COF$$

wherein n is 10 on the average and an acyl fluoride (15 g) of the formula:

$$F(CF_2CF_2CF_2O)_m-CF_2CF_2COF$$

wherein m 20 on the average were charged.

While flowing nitrogen gas at a flow rate of 10 ml/min. in the reactor, the reaction liquid was irradiated from outside by a high pressure mercury lamp at 100° C. for 60 hours to obtain an oily product having a viscosity of 1,180 cst (40° C.). An IR chart of the oily product is shown in the FIGURE.

Example 5

In a stainless steel made 15 liter reactor, a perfluoropolyether (100 g) of the formula:

$$FCOCF_2CF_2-(OCF_2CF_2CF_2)_n-(OC_6F_{12}O)-(CF_2CF_2CF_2O)_n-CF_2CF_2COF$$

wherein n is 10 on the average and, as a solvent, an acyl fluoride (15 g) of the formula:

$$F(CF_2CF_2CF_2O)_m\text{---}CF_2CF_3$$

wherein m is 5 on the average were charged. The reaction mixture was irradiated by an illuminator comprising a 400 W high pressure mercury lamp surrounded by a water-cooling quartz jacket which was inserted in the reactor to proceed the reaction at 80° C. with flowing nitrogen gas and stirring.

After 72 hour illumination, the illuminator was removed and water (2 g) was added. Then, the reaction mixture was stirred for 5 hours and fluorine gas was flowed at 2 ml/min. for 10 hours. After, replacing the atmosphere with nitrogen gas, the reaction mixture was recovered from the reactor.

The reaction mixture was distilled under reduced pressure to remove the perfluoropolyether solvent to obtain a product (93 g) as a residue. The product was filtered though a millipore filter having a pore size of 0.2 μm. The filtrate had a viscosity of 4,951 cst (40° C.) measured by an E type viscometer. The prepared polyether corresponded to a 13.6-mer of the starting perfluoropolyether according to calculation.

Example 6

In a 500 ml three-necked flask filled with dry nitrogen gas, well calcined CsF (2.0 g, 13.2 mmol) and then tetraglyme (50 ml) were charged and a diacyl fluoride (8.0 g, 27.2 mmol) of the formula:

$$FCO\text{---}(CF_2CF_2)_2\text{---}COF$$

was added and cooled to $-10°$ C. Then, tetrafluorooxetane (66 g, 507 mmol) was dropwise added while cooling and stirring at such addition rate that the interior temperature did not exceed $-5°$ C. After stirring for 70 hours, the solvent was removed by distillation at 170° C. under reduced pressure of 1 mmHg to obtain a polyether (64.3 g) as a residue. Yield, 90%.

From the results of infrared spectroscopic and NMR analyses, the prepared polyether was identified as a compound of the formula:

$$[\text{---}(CF_2CF_2CF_2O)\text{---}(CH_2CF_2CF_2O)_a\text{---}CH_2CF_2COF]_2$$

wherein a is 10 on the average.

Example 7

In a thoroughly dried stainless steel made reactor, the polyether obtained in Example 6 (52 g, 18.3 mmol) was charged and heated to a temperature of 90° to 110° C. while stirring by a magnetic stirrer. Then, fluorine gas diluted to 20% by nitrogen gas was flowed in the reactor at a flow rate of 25 ml/min. for 140 hours to obtain corresponding perfluoropolyether (60 g). Yield, 91.8%.

In the infrared absorption spectrum, disapperance of absorption peaks at 3,000 cm$^{-1}$ and 880 cm$^{-1}$ was confirmed. From the results of infrared spectroscopic and NMR analyses, the perfluoropolyether was identified as a compound of the formula:

$$[\text{---}(CF_2CF_2CF_2O)\text{---}(CF_2CF_2CF_2O)_a\text{---}CF_2CF_2COF]_2$$

wherein a is 10 on the average.

What is claimed is:

1. A fluorine-containing polyether of the formula:

$$A\text{---}X\text{---}A' \qquad (I)$$

wherein A and A' are the same or different and are each —COF, —COCl or —COOH, and X is —CF$_2$CF$_2$—R$_f$—O—C$_m$F$_{2m}$—O—R$_f'$CF$_2$CF$_2$— in which R$_f$ and R$_f'$ are the same or different and are each a fluorine-containing polyether chain of the formula:

—(CH$_2$CF$_2$CF$_2$O)$_a$—
—(CHClCF$_2$CF$_2$O)$_b$—(CCl$_2$CF$_2$CF$_2$O)$_c$—(CHFCF$_2$CF$_2$O)$_d$—(CFClCF$_2$CF$_2$O)$_e$—(CF$_2$CF$_2$CF$_2$O)$_f$— wherein a, b, c, d, e and f are each 0 or a positive integer and satisfy the following equations:

$$2 \leq a+b+c+d+e+f \leq 200 \text{ and}$$

$$1 \leq a+c+d+f$$

and m is a number of from 1 to 6.

2. A process for preparing the fluorine-containing polyether as claimed in claim 1, which comprises reacting a difunctional compound of the formula:

$$A\text{---}(CF_2CF_2)_m\text{---}A' \qquad (II)$$

wherein A, A' and m are the same as defined above with 2,2,3,3-tetrafluorooxetane, hexafluoropropyleneoxide or a mixture thereof.

3. A fluorine-containing polyether of the formula:

$$Z\text{---}X_n\text{---}Z' \qquad (III)$$

wherein X is —CF$_2$CF$_2$—R$_f$—O—C$_m$F$_{2m}$—O—R$_f'$CF$_2$CF$_2$— in which R$_f$ and R$_f'$ are the same or different and are each a fluorine-containing polyether chain of the formula:

—(CH$_2$CF$_2$CF$_2$O)$_a$—
—(CHClCF$_2$CF$_2$O)$_b$—(CCl$_2$CF$_2$CF$_2$O)$_c$—(CHFCF$_2$CF$_2$O)$_d$—(CFClCF$_2$CF$_2$O)$_e$—(CF$_2$CF$_2$CF$_2$O)$_f$— wherein a, b, c, d, e and f are each 0 or a positive integer and satisfy the following equations:

$$2 \leq a+b+c+d+e+f \leq 200 \text{ and}$$

$$1 \leq a+c+d+f$$

and m is a number of from 1 to 6, Z and Z' are the same or different and are each —COF, —COCl, —COOH or —CF$_2$CF$_2$—R$_f$—B in which R$_f$ is the same as defined above and B is a fluorine atom of a C$_1$-C$_5$ perfluoroalkyl group, and n is a number of from 0 to 100, provided that when n is 0, both Z and Z' are —CF$_2$CF$_2$—R$_f$B or when n is 1, at least one of Z and Z' is —CF$_2$CF$_2$R$_f$B.

4. A process for preparing a fluorine-containing polyether of the formula:

$$Z\text{---}X_n\text{---}Z' \qquad (III)$$

wherein X is —CF$_2$CF$_2$—R$_f$—O—C$_m$F$_{2m}$—O—R$_f'$CF$_2$CF$_2$— in which R$_f$ and R$_f'$ are the same or different and are each a fluorine-containing polyether chain of the formula:

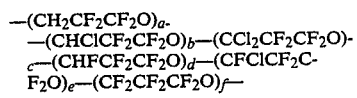

wherein a, b, c, d, e and f are each 0 or a positive integer and satisfy the following equations:

$2 \leq a+b+c+d+e+f \leq 200$ and $1 \leq a+c+d+f$ and m is a number of from 1 to 6, Z and Z' are the same or different and are each —COF, —COCl, —COOH or —CF$_2$CF$_2$—R$_f$—B in which R$_f$ is the same as defined above and B is a fluorine atom or a C$_1$–C$_5$ perfluoroalkyl group, and n is a number of from 0 to 100, which comprises polycondensating a fluorine-containing polyether having a functional group at least at one molecular end by irradiation with ultraviolet light.

5. The process according to claim 4, wherein the fluorine-containing polyether having a functional group at least at one molecular end is a fluorine-containing polyether of the formula:

$$A-X-A' \qquad (IV)$$

or $$A-CF_2CF_2-R_f-B \qquad (V)$$

wherein A and A' are the same or different and are each —COF, —COCl, or —COOH, X is —CF$_2$CF$_2$—R$_f$—O—C$_m$F$_{2m}$—O—R$_f'$CF$_2$CF$_2$— in which R$_f$ and R$_f'$ are the same or different and are each a fluorine-containing polyether chain of the formula:

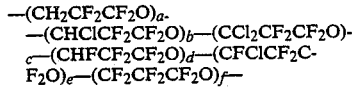

wherein a, b, c, d, e and f are each 0 or a positive integer and satisfy the following equations:

$2 \leq a+b+c+d+e+f \leq 200$ and $1 \leq a+c+d+f$ and m is a number of from 1 to 6, and B is a fluorine atom or a C$_1$–C$_5$ perfluoroalkyl group.

* * * * *